United States Patent [19]
Wichman et al.

[11] Patent Number: 5,884,062
[45] Date of Patent: Mar. 16, 1999

[54] MICROPROCESSOR WITH PIPELINE STATUS INTEGRITY LOGIC FOR HANDLING MULTIPLE STAGE WRITEBACK EXCEPTIONS

[75] Inventors: Shannon A. Wichman, Dallas; Tuan Q. Dao, Richardson; Naoki Hayashi, Dallas, all of Tex.

[73] Assignee: Texas Instruments Incorporated, Dallas, Tex.

[21] Appl. No.: 919,704

[22] Filed: Aug. 28, 1997

[51] Int. Cl.[6] .................................................. G06F 9/38
[52] U.S. Cl. ............................................ 395/394; 395/591
[58] Field of Search ............................ 395/394, 563, 395/591

[56] References Cited

U.S. PATENT DOCUMENTS

| | | | |
|---|---|---|---|
| 5,134,693 | 7/1992 | Saini | 395/591 |
| 5,206,823 | 4/1993 | Hesson | 364/748.08 |
| 5,410,657 | 4/1995 | Olson et al. | 395/391 |
| 5,530,804 | 6/1996 | Edgington et al. | 395/183.06 |
| 5,548,545 | 8/1996 | Brashears et al. | 364/748.01 |
| 5,553,015 | 9/1996 | Elliot et al. | 364/715.04 |
| 5,559,976 | 9/1996 | Song | 395/391 |
| 5,687,106 | 11/1997 | Schwarz et al. | 364/715.03 |
| 5,751,981 | 5/1998 | Witt et al. | 395/380 |

*Primary Examiner*—William M. Treat
*Attorney, Agent, or Firm*—Robert D. Marshall, Jr.; Richard L. Donaldson

[57] ABSTRACT

A microprocessor (5) having an on-chip floating point unit (31) is disclosed. According to the disclosed embodiments, the floating-point unit (31) is arranged in pipelined fashion, and permits out-of-order execution of instructions in the event that an instruction generates an exception, such as an underflow condition. Writeback queue control circuitry (70) is provided, which includes a writeback queue buffer (74) and a multiplexer (72). The multiplexer (72) is under the control of writeback queue control logic (75), and selects either the state of the writeback bus (WB) or the contents of the writeback queue buffer (74) for application to router circuitry (54), and thus writeback to a register file (39). Upon detection of an exception, the state of the writeback bus (WB) is forwarded to the execution units (56, 58, 60) for exception handling according to microcode, with a portion of the floating-point pipeline being flushed. Other instructions may execute, however, with their results stored in writeback queue buffer (74) until completion of the reformatting of the result having the exception. The contents of the writeback queue buffer (74) may be forwarded to the router circuitry (54) for writeback, and the floating-point status word (FSW) updated, in program order. Any of the results stored in the writeback queue buffer (74) that cause an exception may similarly be handled by the microcode sequence.

20 Claims, 7 Drawing Sheets

MICROPROCESSOR WITH PIPELINE STATUS INTEGRITY LOGIC FOR HANDLING MULTIPLE STAGE WRITEBACK EXCEPTIONS

This invention is in the field of integrated logic circuits, and is more specifically directed to logic circuits of the microprocessor type having on-chip floating-point units.

BACKGROUND OF THE INVENTION

Many recent advances in the field of microprocessor design and manufacture have resulted in the improved performance of modern microprocessors. These advances include, of course, improvements in manufacturing technology that have enabled faster and smaller transistors and thus faster switching and higher levels of integration. Advances have also been made in microprocessor architecture that have resulted in improved efficiency in the processing of sequences of instructions. These architectural advances include such features as pipelined instruction execution, and superscalar architectures that issue instructions in parallel for execution.

Another architectural advance resulting in improved microprocessor performance is the implementation of floating-point units (FPUs) on the same integrated circuit with the general purpose microprocessor. An on-chip FPU provides local, dedicated, high-performance circuitry for performing complex floating-point arithmetic operations, reducing the burden on the integer arithmetic logic units of the microprocessor. Typical on-chip FPUs include their own pipeline for execution of floating-point arithmetic instructions, typically with multiple execution stages, considering that floating-point add and multiply operations generally require multiple machine cycles to execute.

Both internal communication of operands between the on-chip FPU and the integer processor core, and also external communication of floating-point operands, typically follow the well-known IEEE 754 standard for single-precision, double-precision, and extended-precision floating-point formats. In normalized form, the IEEE standard implies a leading "1", so that the mantissa of the floating-point data word corresponds only to the fractional portion of the mantissa, with the exponent adjusted accordingly. Numbers having values outside of the exponent ranges specified by the IEEE standard (for a particular precision) are referred to as "denormalized" operands. For example, a number smaller than the minimum limit of the IEEE standard range may be expressed in denormalized form; in this case, a leading "0" is implied so that the mantissa expresses a fractional value less than one. The presence of a denormalized operand is generally indicated by a flag in a floating-point status word.

As is also well known in the art, conventional on-chip FPUs operate according to a fixed internal format that is at least as precise as the highest precision IEEE format used by the integer processor core. Often, the internal FPU format will be of higher precision to maintain highly precise intermediate floating-point results in the execution of multiple-pass instructions. It is therefore possible that the result of a floating-point instruction may be a number which is of a value that requires format conversion prior to its communication to the integer core of the processor, such format conversion requiring additional operations by the FFU itself. If the FPU is of pipelined architecture, the floating-point instruction that generates such a result cannot be immediately completed because format conversion is necessary before writeback. In this case, successive instructions in the FPU pipeline, which are in intermediate stages of execution, may be completed before the preceding instruction. This out-of-order completion may cause certain conflicts in the operation of the FPU, as will now be described.

Referring now to FIG. 1, an example of a conventional FPU pipeline is illustrated. This FPU pipeline may be fully performed by the on-chip FPU, or may partially be performed by the integer pipelines as in the case of the PENTIUM microprocessor available from Intel Corporation. Queue stage 200 initiates the floating-point pipeline, followed by decode stage 202 and issue stage 204. Three execution stages 206, 208, 210 execute, in pipelined fashion, floating-point instructions that have been issued from issue stage 204. In the example of FIG. 1, three instructions n, n+1, n+2 are presently being executed in stages 206, 208, 210, with instruction n being the earliest instruction in the sequence; upon completion of an instruction, the results are forwarded to a writeback stage and a floating-point status word is updated. The writeback stage presents the FPU results to the integer portion of the microprocessor, in program order.

Conflicts may be presented in the pipeline of FIG. 1 in the case where the results of instruction n would constitute a denormalized operand in the IEEE format, but where the format presented by execution stage 210 presents these results in a non-IEEE format (e.g., in normalized fashion but with additional exponent bits). This condition requires the reformatting of the results by the on-chip FPU by way of another pass through the pipeline, beginning with issue stage 204 next issuing (instead of instruction n+3) an instruction corresponding to the reformatting of the results of instruction n. As such, instruction n is not completed in the current pass illustrated in FIG. 1. However, instructions n+1, n+2 may be able to complete, for example if their results turn out not to be denormalized operands. While the out-of-order completion of instructions n+1, n+2 provides performance efficiency, an error regarding the floating-point status word can be generated in this case. This is because the floating-point status word is updated upon completion of each of instructions n+1, n+2, and is then again updated upon completion of instruction n after its reformatting is complete. While writeback of the results would be done in program order (with the proper floating-point status word value for instruction n), the floating-point status word would not be rewritten by instructions n+1, n+2 because they have already been completed. Accordingly, the status word associated with these instructions would incorrectly indicate denormalized operands, in this example. In addition, if FPU resources (such as a non-pipelined microsequencer) are required for the reformatting or other completion, additional conflicts may arise if a later instruction (n+1 or n+2) also results in a denormalized operand or other condition in which the same resource is necessary.

A conventional approach to addressing this problem would flush the entire FPU pipeline upon detecting a denormalized result from the third execution stage 210 for any instruction. Of course, this approach reduces the performance of the FPU by precluding the out-of-order execution of the later-issued instructions (e.g., instructions n+1, n+2 in FIG. 1).

By way of further background, a conventional technique used to effect out-of-order completion in pipelined architectures maintains precise exceptions by way of a reorder buffer. The reorder buffer stores the results of every operation until all prior operations are completed. This approach thus introduces overhead operations into the execution of every instruction, and may also require the implementation of a relatively large buffer into the integrated circuit.

SUMMARY OF THE INVENTION

The present invention may be implemented into a single-chip microprocessor having an on-chip floating-point unit (FPU). A writeback queue is provided to receive the results from the final FPU execution unit, for instructions following an instruction that has not completed; if all previous instructions are successfully complete, writeback of the results, and status updates, are immediately effected. Use of other FPU resources, such as a non-pipelined sequencer, may thus be used for completion of an incomplete writeback result without conflict.

It is an object of the present invention to provide a microprocessor architecture in which out-of-order completion may be effected for an on-chip floating-point unit.

It is a further object of the present invention to provide such an architecture which enables use of the floating-point unit pipeline for completion of an earlier-issued instruction after completion of later-issued instructions.

It is a further object of the present invention to provide such an architecture in which non-pipelined resources may be used for instruction completion without conflict.

Other objects and advantages of the present invention will be apparent to those of ordinary skill in the art having reference to the following specification together with its drawings.

DETAILED DESCRIPTION OF THE PREFERRED EMBODIMENT

Figure 2:
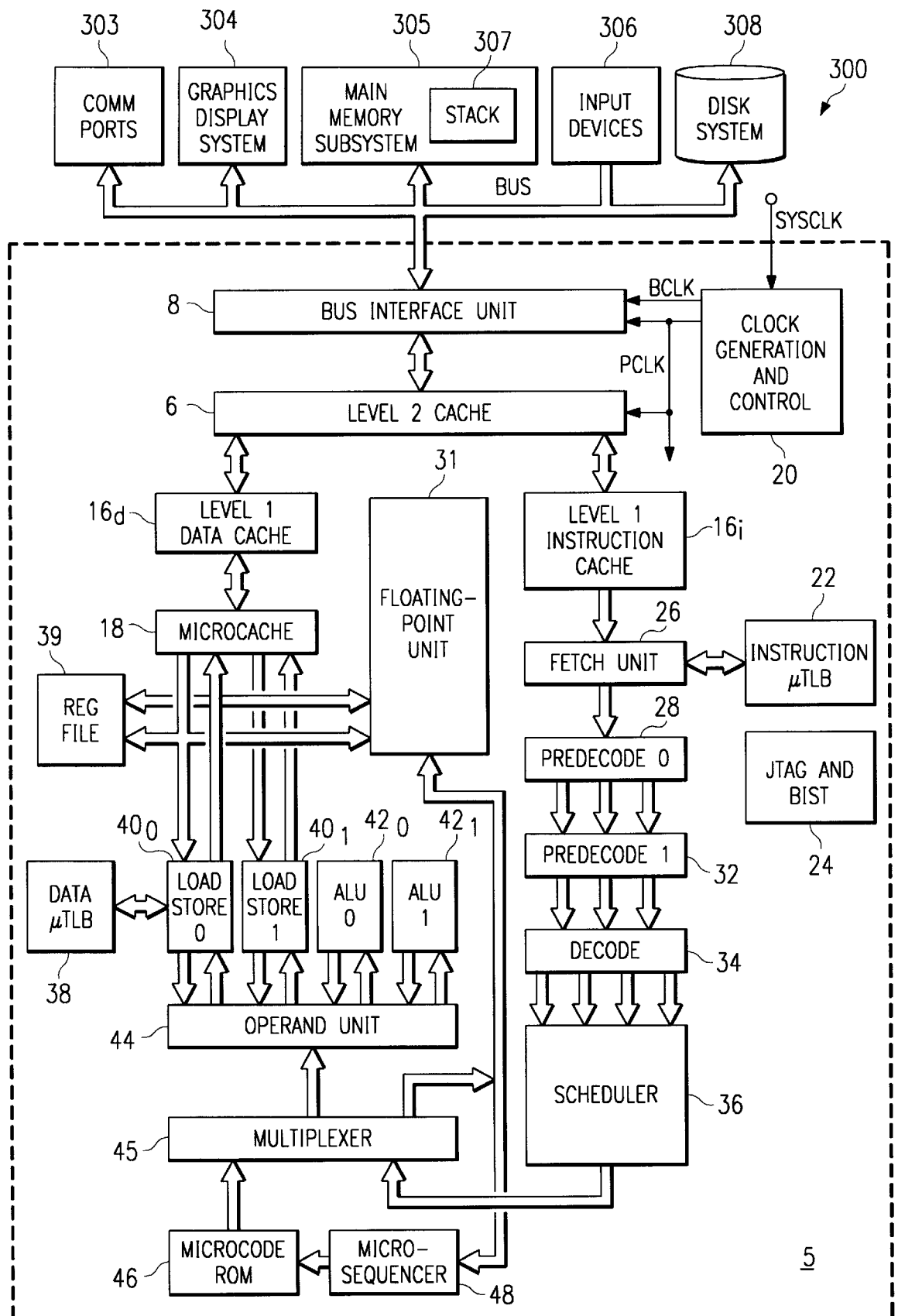
FIG. 2 is an electrical diagram, in block form, of a microprocessor and system constructed according to the preferred embodiment of the invention.

Referring now to FIG. 2, an exemplary data processing system 300, including an exemplary superscalar pipelined microprocessor 5 within which the preferred embodiment of the invention is implemented, will be described. It is to be understood that the architecture of system 300 and of microprocessor 5 is described herein by way of example only, as it is contemplated that the present invention may be utilized in microprocessors of various architectures. It is therefore contemplated that one of ordinary skill in the art, having reference to this specification, will be readily able to implement the present invention in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 5, as shown in FIG. 2, is connected to other system devices by way of external bus BUS. While external bus BUS, in this example, is shown as a single bus, it is of course contemplated that external bus BUS may represent multiple buses having different speeds and protocols, as is known in conventional computers utilizing the PCI local bus architecture. System 300 contains such conventional subsystems as communication ports 303 (including modem ports and modems, network interfaces, and the like), graphics display system 304 (including video memory, video processors, a graphics monitor), main memory system 305 which is typically implemented by way of dynamic random access memory (DRAM), input devices 306 (including keyboard, a pointing device, and the interface circuitry therefor), and disk system 308 (which may include hard disk drives, floppy disk drives, and CD-ROM drives). It is therefore contemplated that system 300 of FIG. 2 corresponds to a conventional desktop computer or workstation, as are now common in the art. Of course, other system implementations of microprocessor 5 can also benefit from the present invention, as will be recognized by those of ordinary skill in the art.

Microprocessor 5 includes bus interface unit (BIU) 8 connected to external bus BUS, which controls and effects communication between microprocessor 5 and the other elements in a system 300. BIU 8 includes the appropriate control and clock circuitry to perform this function, including write buffers for increasing the speed of operation, and including timing circuitry so as to synchronize the results of internal microprocessor operation with bus BUS timing constraints. Microprocessor 5 also includes clock generation and control circuitry 20 which, in this example, generates clock phases based upon system clock SYSCLK.

As is evident in FIG. 2, microprocessor 5 has three levels of internal cache memory, with the highest of these as level 2 cache 6, which is connected to BIU 8 by way of an internal bus. In this example, level 2 cache 6 is a unified cache, and is configured to receive all cacheable data and cacheable instructions from bus BUS via BIU 8, such that much of the bus traffic presented by microprocessor 5 is accomplished via level 2 cache 6. Of course, microprocessor 5 may also effect bus traffic around cache 6, by treating certain bus reads and writes as "not cacheable". Level 2 cache 6, as shown in FIG. 2, is connected to two level 1 caches 16; level 1 data cache $16_d$ is dedicated to data, while level 1 instruction cache $16_i$ is dedicated to instructions. Microcache 18 is a fully dual-ported level 0 data cache, in this example.

As shown in FIG. 2, microprocessor 5 is of the superscalar type, and thus includes multiple execution units. These execution units include two ALUs $42_0$, $42_1$ for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer (μTLB) 38 is provided to translate logical data addresses into physical addresses, in the conventional manner.

These multiple execution units are controlled by way of multiple pipelines of seven stages each, with write-back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units (including FPU 31) |
| OP | Operand: This stage retrieves the register operands indicated by the AOps |
| EX | Execute: This stage runs the execution units according to the AOps and the retrieved operands |
| WB | Write-back: This stage stores the results of the execution in registers or in memory |

The operation of this pipeline, referred to hereinbelow as the "integer pipeline", in combination with the floating-point pipeline of FPU 31 according to the preferred embodiment of the present invention will be described in further detail hereinbelow.

Referring back to FIG. 2, the pipeline stages noted above are performed by various functional blocks within microprocessor 5. Fetch unit 26 generates instruction addresses from the instruction pointer by way of instruction microtranslation lookaside buffer (μTLB) 22, for application to level 1 instruction cache $16_i$. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multi-byte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from scheduler 36 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multi-cycle instructions (such as REP instructions, and instructions that PUSH and POP all registers).

Microprocessor 5 also includes circuitry 24 for controlling the operation of JTAG scan testing, and of certain built-in self-test (BIST) functions, ensuring the validity of the operation of microprocessor 5 upon completion of manufacturing, and upon resets and other events.

Figure 1:
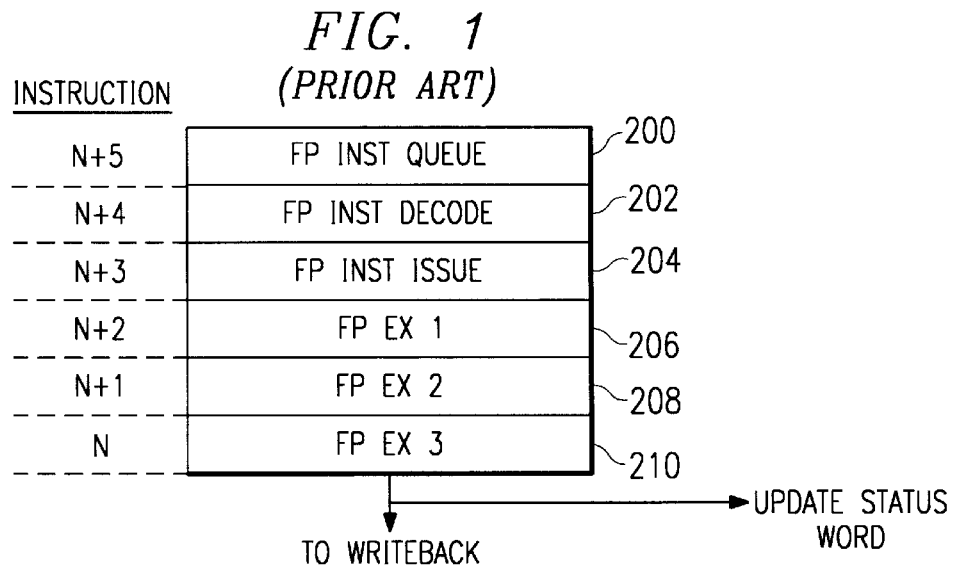
FIG. 1 is a flow diagram of a floating-point pipeline according to the prior art.
Figure 3:
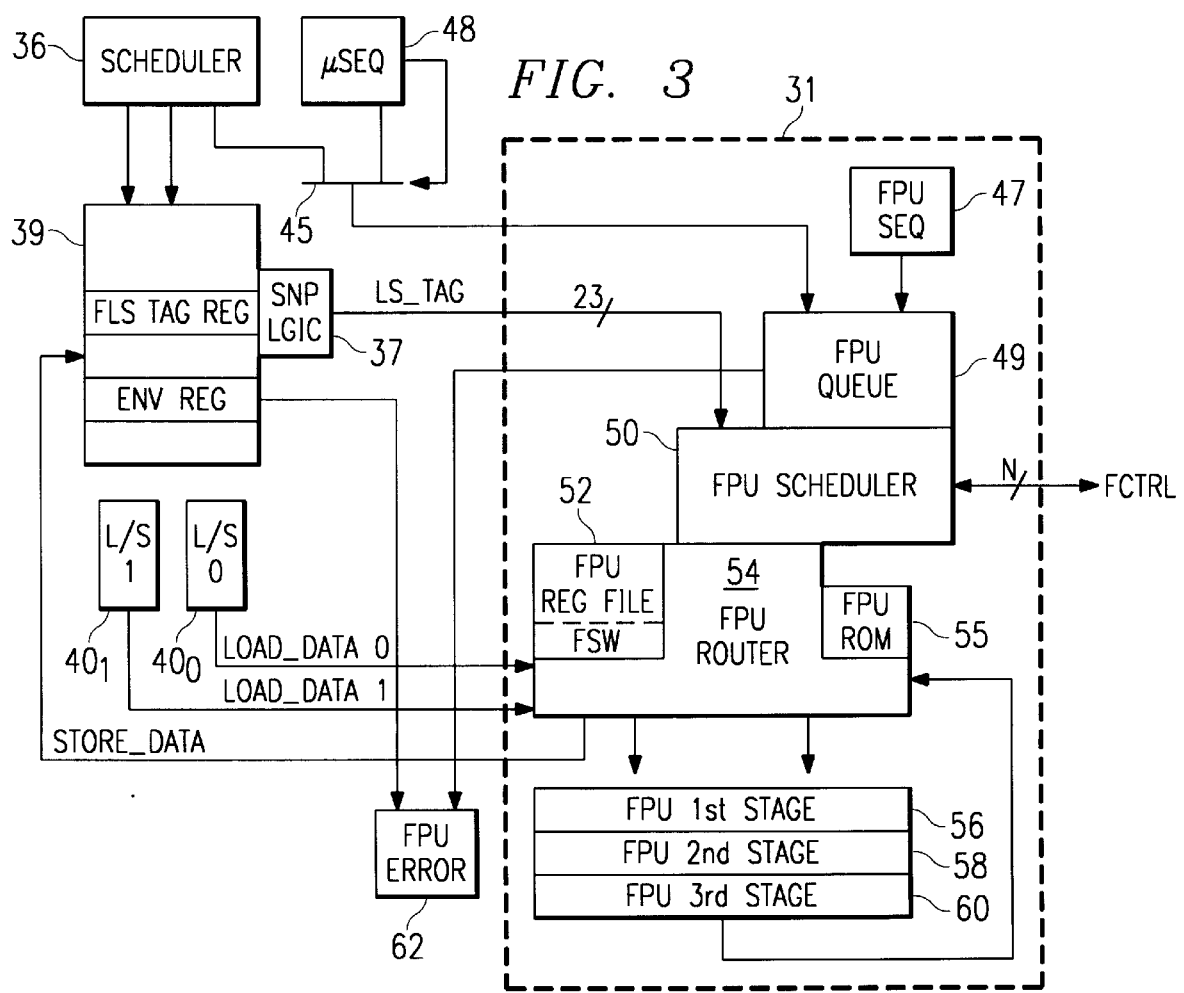
FIG. 3 is an electrical diagram, in block form, of a floating-point unit in the microprocessor of FIG. 2.

Referring now to FIG. 3, the construction of FPU 31 according to this embodiment of the invention, and its interconnection with the other functional blocks of microprocessor 5, will now be described in detail. This construction of FPU 31 is presented by way of example only, as it is to understood that the present invention will be beneficial in the implementation of floating-point units constructed according to other architectures and designs.

Each of the functional blocks of FPU 31 will be described in individual detail hereinbelow. FPU 31 includes FPU queue stage 49, which is effectively an instruction buffer, between the integer portions of microprocessor 5 and the execution stages of FPU 31. FPU queue stage 49 receives FPU instructions from scheduler 36 or from integer microsequencer 48 (in the case of microcoded instructions), via multiplexer 45 that is under the control of microsequencer 48. FPU queue stage 49 also receives FPU instructions from FPU microsequencer 47, for the execution of microcoded FPU instructions.

FPU queue stage 49 is connected to FPU scheduler 50 which, in this example, performs the scheduling function for floating-point instructions separately from scheduler 36 in the integer portion of microprocessor 5. FPU scheduler 50 is logic that operates in similar fashion as scheduler 36, responsive to instructions forwarded thereto from FPU queue stage 47, and also responsive to address information conveyed thereto from register file 39. Register file 39 includes at least one register FLS TAG, which stores the format of data operands that are to be used by FPU 31. Snoop logic 37 is associated with register file 39 to monitor the pipeline for load/store operations corresponding to floating-point instructions, for example as may be stored in register FLS TAG. Snoop logic 37 encodes certain information corresponding to floating-point load/store directives, and forwards this information to FPU scheduler 50 on bus LS_TAG. In response to the floating-point AOps and to the load/store directives, FPU scheduler 50 issues control signals to the remaining functional blocks of FPU 31 to execute the instructions communicated thereto.

In this example, FPU 31 includes its own register file 52. Registers included within FPU register file 52 include a floating-point status word (FSW), a floating-point control word (FCW), and an eight-register data stack (consistent with the x86 instruction set). The five floating-point environment registers, useful for interrupt handling, are included in register file 39 (shown in FIG. 3 as ENV), as these registers are not used internally by FPU 31.

FPU router stage 54 operates in conjunction with FPU scheduler 50 to forward the desired operands to the execution stages of FPU 31. FPU router stage 54 receives floating point operands from multiple sources, such sources including load/store units $40_0$, $40_1$ (presenting data on buses LOAD_DATA0, LOAD_DATA1, respectively), floating-point register file 52, constant data ROM 55, and FPU $3^{rd}$ execution stage 60 (which presents writeback data from the results of prior instructions). Constant data ROM 55 stores common floating-point constants (e.g., π, √2) that may be used in floating-point instruction execution, particularly in transcendental function evaluation. FPU router stage 54 selects among the various operands for presentation to FPU $1^{st}$ stage 56 for execution.

FPU $1^{st}$, $2^{nd}$, and $3^{rd}$ execution stages 56, 58, 60, respectively, each include conventional arithmetic logic units used in floating-point arithmetic, and each include a status pipeline, a datapath, and a control pipeline. The control pipeline communicates control information regarding the instruction type, rounding mode, precision, exception masks and format control signals, along with the current instruction and operands in the corresponding execution stage. Similarly, the status pipeline uses both the control signals and also the data related information from the data path to generate an instruction status that also travels along with the instruction and operands along the FPU execution pipeline. The data path, including both an exponent pipeline and a mantissa pipeline given the floating-point operation of FPU 31, includes the necessary hardware for performing the arithmetic operations corresponding to the instruction. The output of FPU $3^{rd}$ stage 60 is forwarded back to FPU router 54 for further handling. The datapaths of FPU $1^{st}$, $2^{nd}$, and $3^{rd}$ execution stages 56, 68, 60 will be described in further detail hereinbelow.

Communication of control signals and data to and from FPU 31 is effected in several ways. As noted above, multiplexer 45 forwards floating-point instructions to FPU queue stage 49 from integer scheduler 36 and microcontroller 48, and FPU 31 receives certain information regarding the format of operands from register file 39 on bus LS_TAG. Operands retrieved from memory are also forwarded from load/store units 40 to FPU router 54, as noted above. The results of the floating-point instruction are presented by FPU router 54 to register file 39 on bus STORE_DATA, as shown in FIG. 3. Status information, including identification of denormalized operands and other exceptions are communicated from the floating-point status word (FSW) for each floating-point result for storage in FPU error registers 62, via environment registers ENV in register file 39 and also by FPU queue stage 49. Other control signals, including signals to flush the FPU pipeline and to stall FPU operation, are communicated to and from FPU scheduler 50 by way of FPU control bus FCTRL.

As is evident from FIG. 3, FPU 31 in this example includes its own scheduler 50, separate and distinct from scheduler 36 for the integer pipeline of microprocessor 5. According to this preferred embodiment of the invention, therefore, the scheduling of atomic floating-point operations (atomic in the RISC sense) is performed by FPU 31 itself, and does not require the involvement of scheduler 36. In effect, each floating-point instruction issued by scheduler 36 is, from the viewpoint of scheduler 36, an atomic operation in the same sense as atomic operations on the integer side. As a result of this architecture, the integer pipeline need not stall or wait for the completion of floating-point instruction execution (as in the case of conventional x86 architecture CISC processors), nor does scheduler 36 become bogged down in the scheduling of both atomic floating-point operations and integer atomic operations, as in the case of conventional RISC processors.

The scheduling operations performed by FPU scheduler 50, FPU queue stage 49, and router 54 in FPU 31 include those operations required to launch floating-point instructions into their execution stages. In this regard, queue stage 49 decodes the atomic floating-point operations received from scheduler 36 into the appropriate control signals, and scheduler 50 applies these control signals to the execution stages in FPU 31, after determining whether the atomic floating-point operations are of the single-cycle, single-pass, or microcoded type, and after identifying and handling any dependencies or hazards caused thereby. Scheduler 50 is also responsible for obtaining and formatting the floating-point operands for launching along with the control signals.

Also according to this preferred embodiment of the invention, scheduler 50 in FPU 31 also handles instruction completion, including writeback and update of machine status. In the event of any exceptions resulting from the execution of a floating-point operation, such as NaN (not a number), overflow, underflow, and the like, scheduler 50 is also responsible for handling the exceptions and reporting the exceptions to the integer pipeline, as will be described hereinbelow. Scheduler 50 and router 54 also provide an interface with the integer logic, as is necessitated by the distribution of the scheduling function to FPU 31.

Figure 4:
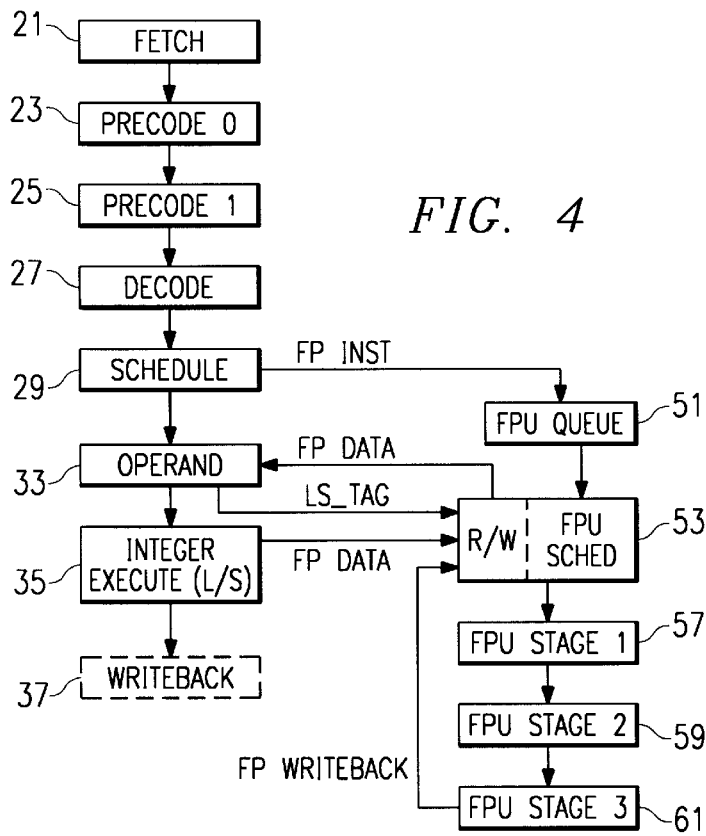
FIG. 4 is a flow chart illustrating the cooperation between the integer and floating-point pipelines in the microprocessor of FIG. 2.

Referring now to FIG. 4, the cooperative operation of the integer and floating-point pipelines in microprocessor 5 according to the preferred embodiment of the invention will now be described. As described in detail hereinabove, both integer and floating-point instructions follow a pipeline (or multiple pipelines, considering the superscalar nature of microprocessor 5 according to this embodiment of the invention) beginning with the instruction fetch stage 21, predecode 0 stage 23, predecode 1 stage 25, and instruction decode stage 27; these operations are performed by fetch unit 26, predecode 0 stage 28, predecode 1 stage 32, and decode unit 34, respectively, as described hereinabove. Schedule stage 29 in the pipeline, performed by scheduler 36 as described above, issues non-floating-point instructions as atomic operations (AOps) or as microcoded sequences, each of which pass through the operand (or register) pipeline stage and are executed (including access of load/store units 40) in stage 35. Writeback operations then are performed in pipeline stage 37.

In schedule stage 29, scheduler 36 forwards floating-point instructions to floating point queue pipeline stage 51, in the form of complete atomic instructions (FP INST in FIG. 4). After buffering by floating-point queue 49, these floating-point instructions are then scheduled by FPU scheduler 50 in FPU scheduling pipeline stage 53. Floating-point queue stage 51 is inserted prior to FPU scheduling stage 53 in the FPU pipeline because all memory accesses require two cycles (register access and load/store) in the x86 architecture. FPU queue stage 49 is thus used to perform opcode decoding and other instruction routing functions for a new floating-point instruction prior to its scheduling, given the necessity for the additional cycle for memory access.

Following floating-point queue pipeline stage 51, the floating-point instruction next enters the floating-point schedule pipeline stage 53. As shown in FIG. 4, floating-point schedule stage 53 also includes a read/write stage, which is performed by FPU router 54 simultaneously with the scheduling performed by FPU scheduler 50. In floating-point schedule pipeline stage 53, scheduler 50 checks the instruction for dependencies, fetches the register operand (illustrated by the parallel read/write stage), and prepares the instruction for execution. As in the case of integer scheduling described hereinabove, each floating-point instruction is scheduled as atomic operations, and may be single-cycle atomic instructions, single-pass multi-cycle instructions, or microcode instructions. Examples of single-cycle instructions include register exchange instructions (FXCH) and simple arithmetic instructions such as change sign (FCHS) and absolute value (FABS). Single-pass instructions include arithmetic operations such as multiply, add, subtract, and compare (FMUL, FADD, FSUB, FCOM, respectively). Microcode instructions are typically a sequence of single-pass and single-cycle instructions stored in ROM for performing complex operations such as square-root, transcendental function evaluation and the like.

Once scheduling stage 53 is complete, the floating-point instructions are executed in three successive execution stages 57, 59, 61. The results of FPU $3^{rd}$ stage 61 are then returned to parallel read/write stage 53 for forwarding into the integer pipeline, as shown in FIG. 4.

Figure 5:
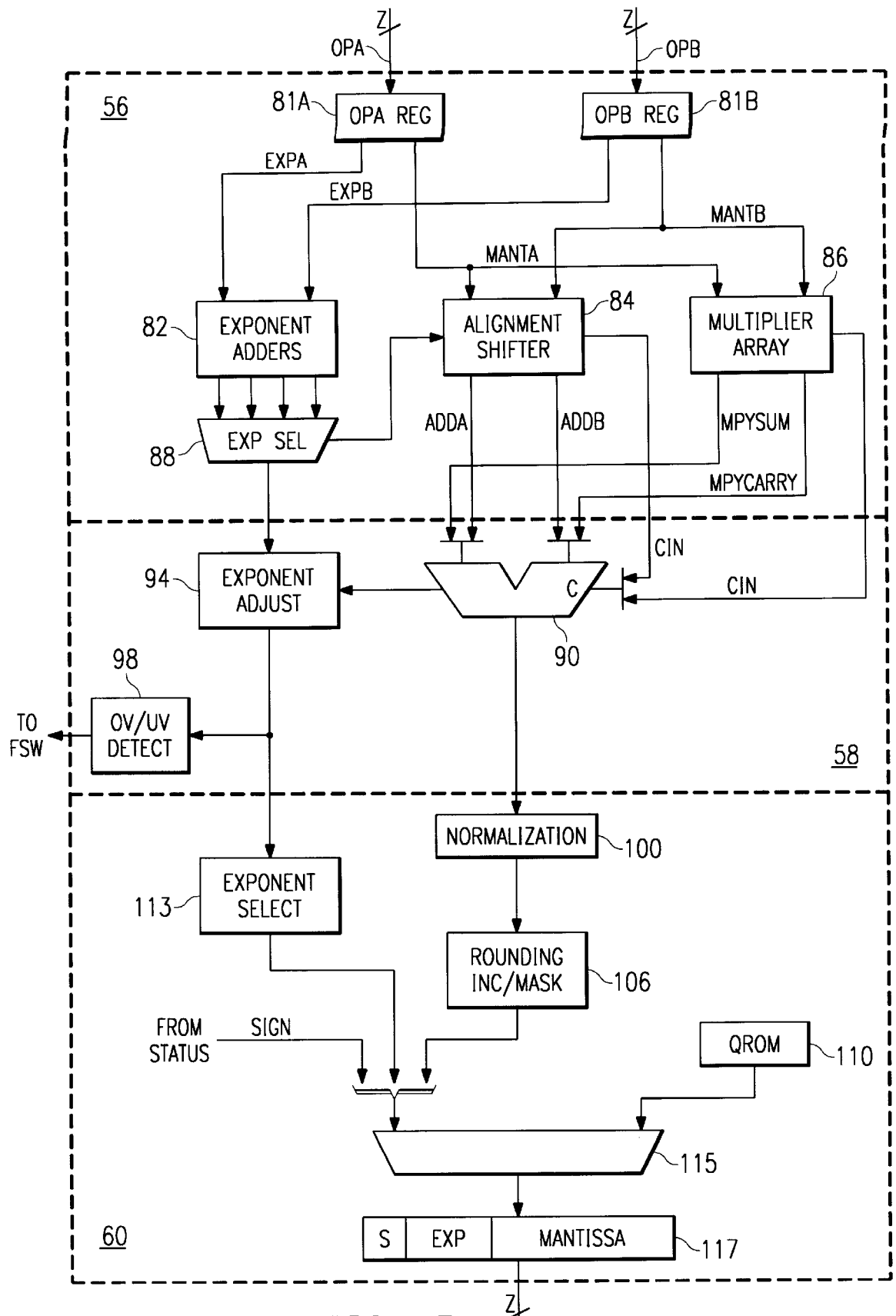
FIG. 5 is an electrical diagram, in block form, of the execution stages in the floating-point unit of FIG. 3 according to the preferred embodiment of the invention.

Referring now to FIG. 5, the datapaths of FPU $1^{st}$, $2^{nd}$, and $3^{rd}$ execution stages 56, 58, 60 will now be described. As noted above, each of execution stages 56, 58, 60 also include control and status pipelines, along which control signals and status information travel in conjunction with the operands in the corresponding datapath.

FIG. 5 illustrates the construction of the datapath portion of FPU $1^{st}$ execution stage 56 according to this preferred embodiment of the invention. Operands OPA and OPB are received from router 54 and stored in registers 81A, 81B, respectively. In this embodiment of the invention, FPU $1^{st}$ execution stage 56 includes three datapaths; one datapath handles the exponents of floating-point operands OPA and OPB, a second datapath aligns the mantissas of operands OPA and OPB for add and subtract instructions, and a third datapath multiplies operands OPA and OPB for multiply and divide instructions. As such, exponent adders 82 in FPU $1^{st}$ execution stage 56 receive exponent portions EXPA, EXPB of operands OPA, OPB, respectively, and generate the four results EXPA+EXPB−bias, used in multiplication; EXPA−EXPB+bias, used in division; and the results EXPB−EXPA and EXPA−EXPB used in floating-point adds and subtracts. Exponent selector 88 selects from among the four exponent adder results, under the control of a control signal from FPU scheduler 50, as generated for the current instruction. The output of exponent selector 88 produces an exponent value that is forwarded to FPU $2^{nd}$ execution stage 58; these, and the others of, outputs from FPU $1^{st}$ execution stage 56 are typically registered outputs for purposes of stability (the registers not shown in FIG. 5 for clarity).

The addition datapath in FPU $1^{st}$ execution stage 56 includes a conventional alignment shifter 84 that shifts the mantissas of the operands (applied thereto on lines MANTA and MANTB), as required by additive instructions such as floating-point adds and subtracts and by a shift count indicated by exponent selector 88, based upon the greater of the results EXPA−EXPB or EXPB−EXPA. The outputs of alignment shifter 84 on lines ADDA, ADDB, CIN (carry in), and a sticky bit (not shown) are applied to FPU $2^{nd}$ execution stage 58. As is conventional in the art, the sticky bit is the logical OR of the bits shifted out of the end of alignment shifter 84, and is used in rounding. Other conventional floating-point add hardware, such as a mantissa comparator to compute the sign of the result in effective subtraction events or to determine the larger of two NaN operands, and the like, may also be provided in combination with alignment shifter 84. The multiplication datapath in FPU $1^{st}$ execution stage 56 includes a conventional multiplier array 86, including a conventional Booth recoder (not shown) if desired; lines MANTA, MANTB are received by multiplier array 86, which provides outputs on lines MPYSUM, MPYCARRY, CIN, and a sticky bit (not shown) to FPU $2^{nd}$ execution stage 58, as is conventional in the art for floating-point multipliers.

Additionally, FPU $1^{st}$ execution stage 56 includes logic (not shown) for recognizing the exceptions of denormalized operands, and of special operands such as zero, infinity, NaN, and the like, when presented as input operands OPA, OPB. This recognition is performed at the input stage because execution stages 56, 58, 60 in FPU 31 are arranged to only operate on normalized operands, according to tis embodiment of the invention. Typically, these input exceptions will be handled by FPU $1^{st}$ execution stage 56 issuing a floating-point sequencer request to FPU microsequencer 47. The input operands will then be reformatted by operation of execution stages 56, 58, 60 executing a microcode sequence called from FPU microsequencer 47. Subsequent instructions in floating-point queue and schedule stages 51, 53 will be aborted until the input exception is handled.

FPU $2^{nd}$ execution stage 58 includes exponent adjust circuit 94, including preferably a conventional leading bit estimator circuit to derive an exponent shift count that estimates the position of the leading bit of the result for forwarding to normalization circuit 100 in the mantissa data path of FPU $3^{rd}$ execution stage 60. The exponent value may also be incremented or decremented in exponent adjust circuit 94, and applied to FPU $3^{rd}$ execution stage 60. In addition, the exponent values output from exponent adjust circuit is also forwarded to over/underflow detector 98, which generates underflow and overflow flags in floating-point status word FSW in the event of an exception. The mantissas for the add and multiply cases are presented to adder 90 by way of multiplexers controlled by a control signal from the control pipeline (not shown) according to whether an add or multiply instruction is being executed. Adder 90, which is a conventional adder of the carry-propagate (CPA) type, receives the mantissa results from FPU $1^{st}$ execution stage 56, and also a selected carry-in input. The result of the addition by adder 90 is presented to normalization circuit 100 in FPU $3^{rd}$ execution stage 60. The sticky bits are also forwarded to rounding circuitry in FPU $3^{rd}$ execution stage 60.

In FPU $3^{rd}$ execution stage 60, normalization circuit 100 receives a shift count from FPU $2^{nd}$ execution stage 58, and shifts the result of adder 90 by the shift count indicated, and also performs a fine shift as required. FPU $3^{rd}$ execution stage 60 also includes rounding circuitry 106 that increments the normalized mantissa in order to calculate a rounded up value using one of several previously stored roundup entries, selected according to the precision mode for the instruction being executed. An appropriate rounding mask corresponding to a precision mode is also combined with the normalized mantissa (both with and without incrementing), with the appropriate value selected and applied as the mantissa result to result selector 115, under the control of a roundup signal from combinational logic that analyzes the states of the sign bit, LSB, guard bit, round bit, and sticky bit of the mantissa to determine whether the normalized mantissa is to be rounded.

The appropriate exponent value from FPU $2^{nd}$ execution stage 58 is presented to multiplexer 115, as determined by the current operation and the values of the operands themselves. The sign bit is forwarded from the parallel floating-point status pipeline (not shown) directly to the sign bit location in result register 112.

As shown in FIG. 5, FPU $3^{rd}$ execution stage 60 also includes quick ROM 110, which stores certain constants, such as indefinite QNaN, zero, infinity (±), π and common fractions of π, and the largest representable number in each available precision format, that are often used in floating-point operations either as the result of an operation or in the event of an exception. These constants are accessed by address values generated by FPU $1^{st}$ execution stage 56.

Result selector 115 selects from between the calculated mantissa, sign, and exponent values and the output of quick ROM 110 for storing the results in result register 117 depending upon the result of the instruction (i.e., whether or not an exception occurred). The contents of result register 117 are forwarded on writeback bus WB to FPU router 54 as discussed above relative to FIG. 3, and as will be discussed in further detail hereinbelow. With completion of the operations of FPU $3^{rd}$ execution stage 60, one pass in the performance of a floating-point instruction is complete.

Figure 6:
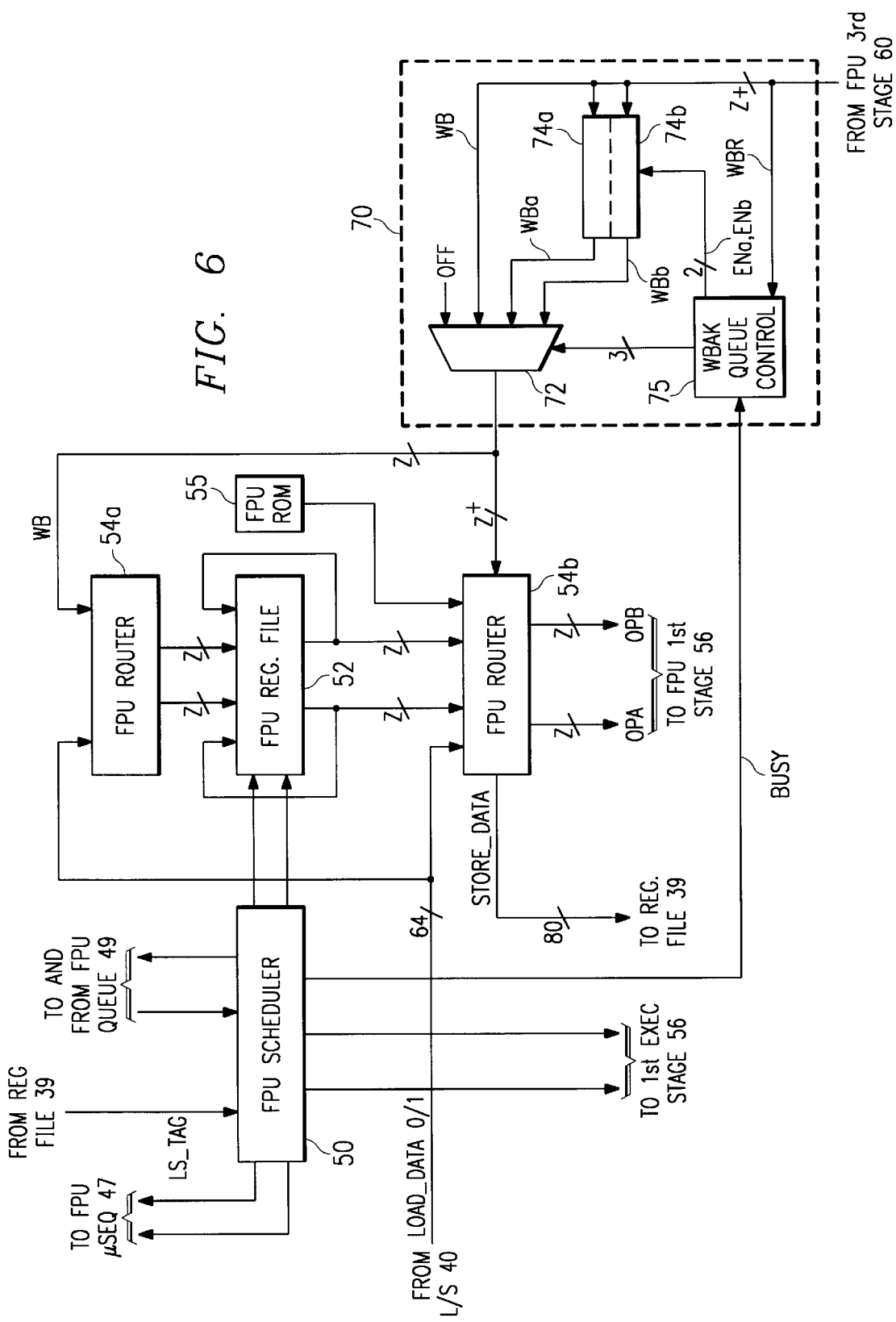
FIG. 6 is an electrical diagram, in block form, of circuitry in the floating-point unit of FIG. 3 for controlling the writeback stage according to the preferred embodiment of the invention.

Referring now to FIG. 6, the interconnection of FPU scheduler 50, FPU register file (FPR) 52, FPU router 54, and FPU ROM 55 will now be described in detail, as performing the scheduling and read/write FPU pipeline stage 53 (of FIG. 4). As shown in FIG. 6 and as referred to hereinabove, FPU scheduler 50 receives control signals and receives a portion of the instruction itself from FPU queue stage 49. According to the preferred embodiment of the invention, scheduler 50 provides central execution control for each floating-point instruction to be executed by FPU 31. Maximum floating-point performance will be maintained by scheduling a new instruction in each cycle, such that the execution pipeline remains full. In order to approach this goal, resource dependencies and exception hazards are identified and handled by FPU scheduler 50.

FPU scheduler 50 also receives load/store directives on lines LS_TAG from snoop logic 37 of register file 39. Snoop logic 37 analyzes the many load/store atomic operations processed along the integer pipeline, identifies those that relate to floating-point operations, and encodes information regarding memory loads and stores for floating-point operands onto lines LS_TAG. The load/store directives on lines LS_TAG indicate the format of the floating-point operands that are to be communicated to FPU 31, and other information regarding a floating-point instruction. For example, lines LS_TAG will indicate whether the integer registers are the destination or source for a particular floating point instruction, whether the instruction is a single cycle instruction (push to top of stack, write to FPR 52, or store), the precision and type of the data (single or double precision, integer, floating-point, status or control word, etc.), and the portion of an extended precision floating point word to which the thirty-two bit operand corresponds. These parameters are used by FPU scheduler 50 to properly control the remainder of the circuitry in FPU 31, such as on read enable and write enable control lines sent to FPU register file 52, and on control lines forwarded to FPU execution stages 56,58,60.

According to this preferred embodiment of the invention, FPU scheduler 50 receives instruction control signals and directives from three sources, namely directives from load/store units 40 on lines LS-TAG, decoded control signals and opcodes from FPU queue stage 49 on lines FDC and QUE_FPI, respectively, and address information from writeback bus WB generated by FPU $3^{rd}$ execution stage 60 in response to a single-pass instruction previously launched, executed, and completed. Based upon these inputs, FPU scheduler 50 checks for dependencies, or pipeline conflicts, among the resources to which the instructions, control signals and directives point. The source and destination resources to which the floating-point AOps already in the pipeline are recorded and analyzed by FPU scheduler 50 relative to each new instruction or directives in performing this function. FPU scheduler 50 also updates and maintains the machine status, for example by way of a floating-point status word PSW and a floating-point control word FCW.

Based on this information, scheduling logic in FPU scheduler 50 determines which operations to actually launch for execution in the next cycle. In the event that no dependencies are detected and that the currently scheduled instruction includes a read or write to a register in the stack, FPU scheduler 50 issues commands to floating-point register file 52 to validate previously issued enable signals according to the instruction being scheduled, and generates signals to FPU router 54 to select the appropriate operands for forwarding to FPU $1^{st}$ execution stage 56 according to the instruction being launched. Also depending upon the instruction, FPU scheduler 50 may initiate a floating-point microcoded instruction by issuing the responsible floating point instruction and a corresponding microcode entry address to queue stage 49, which will initiate the microcode routine from the entry address so that the next sequence of instructions will be generated from FPU microsequencer 47 in microcode. Finally, single-pass instructions are initiated by FPU scheduler 50 by signals on control lines to FPU $1^{st}$ execution stage 56.

Further details regarding the construction and operation of scheduler 50 according to the preferred embodiment of the invention may be found in U.S. Provisional application Ser. No. 60/014847, filed Apr. 4, 1996, commonly assigned herewith and incorporated hereinto by this reference.

In normal operation, where no conflicts or dependencies are detected, a new floating-point instruction will advance through FPU scheduler 50 on every cycle. In the event that a dependency is detected, FPU scheduler 50 will stall the pipeline. The instruction being scheduled at the time of a stall will not proceed, and will be held up until the dependency or exception clears. As will be described in further detail hereinbelow, in the event that the execution of an instruction cannot complete in normal fashion due to an exception (e.g., the result must be reformatted as an IEEE denormalized operand), writeback queue circuitry 70 will control the writeback operation.

FPU router 54 may be considered in two portions 54$a$, 54$b$, as shown in FIG. 6, with portion 54$a$ routing the appropriate data to FPU register file 52, and with portion 54$b$ routing the appropriate signals from FPU register file 52 and elsewhere to the execution stages as operands OPA, OPB, and to register file 39 on lines STORE_DATA. Both of FPU router portions 54$a$, 54$b$ are substantially an assembly of multiplexers that receive data from load/store units 40 on a sixty-four bit bus made up of lines LOAD_DATA0/1. FPU router portion 54$a$ also receives an eighty-nine bit data word (referred to herein as the ZBUS, and labeled as such in FIG. 6) on lines WB from FPU $3^{rd}$ execution stage 60. The ZBUS format in this exemplary microprocessor is an 89-bit bus that represents the operand as (in order from MSB to LSB) one sign bit, a sixteen-bit exponent, and a seventy-two bit mantissa. This format, which is larger than the 80-bit IEEE extended precision format, includes additional precision in the mantissa to store intermediate results during divides, square-root, and transcendental functions that are executed as multiple passes through FPU 31. FPU router portion 54$a$ thus presents the appropriate information from writeback bus WB via writeback queue circuitry 70, and from lines LOAD_DATA0/1 to FPU register file 52, also by way of eighty-nine bit buses in ZBUS format. Lower FFU router portion 54$b$ receives operands from FPU register file 52 (on Z buses), receives operands retrieved from memory by load/store units 40 on lines LOAD_DATA0/1, receives constants useful in the evaluation of floating-point functions from FPU ROM 55 when called, and receives results on writeback bus WB from FPU $3^{rd}$ execution stage 60 via writeback queue circuitry 70. Under the control of FPU scheduler 50, FPU router portion 54$b$ will present the selected operands, in Z bus format, to FPU $1^{st}$ execution stage 56 on operand buses OPA, OPB.

Instruction completion operations are handled by scheduler 50 and router 54 in FPU 31, with the assistance of writeback queue circuitry 70 according to this preferred embodiment of the invention, without requiring intervention into or by the integer pipeline. Specifically, writeback queue circuitry 70 permits the execution of instructions that are later in program order, prior to the completion of an earlier instruction, in program order, that generates an exception in its execution, as will be described in further detail hereinbelow. Referring to FIG. 6 in this regard, writeback bus WB is received by one input of multiplexer 72 in writeback queue circuitry 70, and also by writeback queue buffer 74. In this preferred embodiment of the invention, because two additional instructions (namely those that are partially executed) are to be completed prior to the completion of an instruction that generates an exception, writeback queue buffer 74 has two entries, 74a, 74b. Of course, for floating-point pipelines of different depth, the number of entries in the writeback queue buffer will similarly correspond to the number of instructions to be executed prior to the completion of an instruction having a result that generates an exception.

Figure 7:
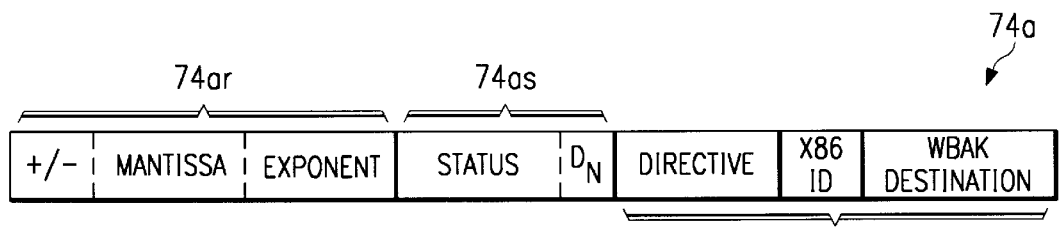
FIG. 7 is a diagram illustrating the contents of one of the entries of the writeback queue buffer of FIG. 6 according to the preferred embodiment of the invention.

FIG. 7 illustrates the contents of entry 74a of writeback queue buffer 74 according to this preferred embodiment of the invention; of course, entry 74b in the two-entry writeback queue buffer 74 of FIG. 6 will be similarly constructed to store information corresponding to the results of another instruction. Entry 74a includes a results portion 74ar, which stores the data result of its corresponding instruction. This result is, of course, in floating-point format, having a sign bit, a mantissa, and an exponent; in this example, since FPU execution stages 56, 58, 60 operate upon normalized operands to generate a ZBUS result, portion 74ar will have eighty-nine bits, and will presume a leading 1 for the mantissa. Entry 74a has a status portion 74as which stores status information concerning the result stored in portion 74ar, including a bit DN indicating, when set, that the result is out of range for the selected IEEE precision level and that the result will therefore require reformatting to be presented as a denormalized operand externally from FPU 31. Entry 74a further includes a control portion 74ad, for storing a directive relating to the desired writeback operation, the writeback destination of the result, and also the x86ID for the instruction (which indicates the location of the instruction in program order).

Referring back to FIG. 6, multiplexer 72 is controlled by writeback queue control circuitry 75 to select, for presentation at its output to router portions 54a, 54b, either the current state of writeback bus WB or one of the entries 74a, 74b of writeback queue buffer 74, or lines OFF (which indicate an invalid, or dummy, state). The operation of writeback queue circuitry 70 according to the preferred embodiment of the invention will be described in detail hereinbelow. In any case, the output of multiplexer 72 presents either the results of a completed floating-point instruction, or data that is to be operated upon in another pass through execution stages 56, 58, 60. In the case of a completed instruction, FPU scheduler 50 controls router portion 54b to communicate the results of the operation of FPU 31 to bus STORE_DATA, for storage in register file 39 and ultimately, if so directed, for storage in memory. As noted above, scheduler 50 follows a priority scheme by way of which writeback operations have the highest priority, as this reduces the possibility of resource dependencies or hazards.

In the case of a data result that generated an exception that requires reprocessing, router portion 54a communicates the results of FPU $3^{rd}$ execution stage 60 to floating-point register file 52 for use in subsequent instructions launched by scheduler 50. According to the preferred embodiment of the invention, those exceptions that will require additional processing prior to effecting a writeback of the result are referred to as incomplete writeback exceptions, and include conditions such as an underflow where the normalized number presented on writeback bus WB, in ZBUS format, has an exponent below the minimum exponent for the IEEE precision level.

Writeback queue control logic 75 is preferably a state machine that controls multiplexer 72 and writeback queue buffer 74 responsive to writeback request signals on line WBR from writeback bus WB and to control signals on line BUSY from FPU scheduler 50. Line WBR indicates, when active, that a writeback is being requested and that data is ready on writeback bus WB. Line BUSY indicates, when active, that a writeback has generated an incomplete writeback exception, such as an underflow, and that therefore FPU scheduler 50 cannot accept any additional writebacks. Responsive to these signals, writeback queue control logic 75 controls multiplexer 72 to select writeback bus WB, the contents of one of writeback queue buffer entries 74a, 74b, or lines OFF, as appropriate; writeback queue control logic 75 also controls writeback queue buffer 74 by way of two control lines ENa, ENb which, when active, cause writeback queue buffer entries 74a, 74b, respectively, to accept the state of writeback bus WB for storage therein.

Figure 8:
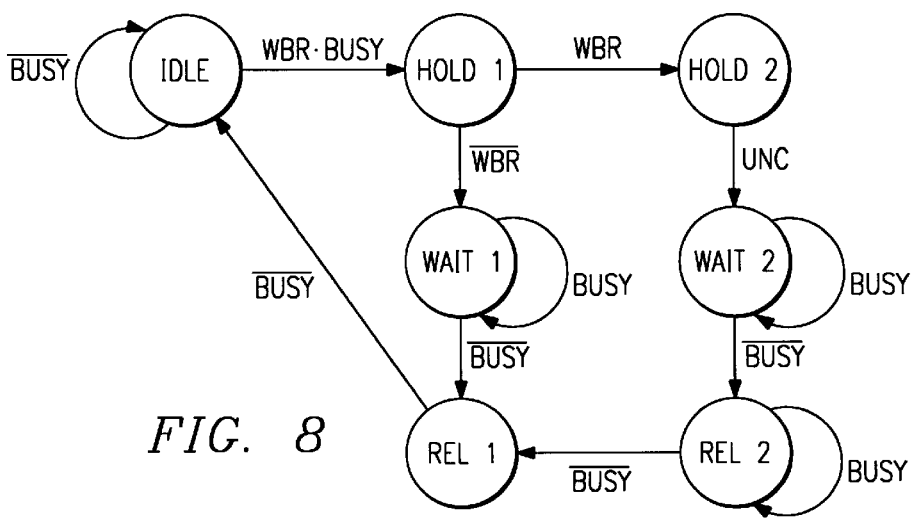
FIG. 8 is a state diagram of writeback queue control circuitry in the circuitry of FIG. 6 according to the preferred embodiment of the invention.

According to this preferred embodiment of the invention, writeback queue control logic 75 is sequential logic having a number of states, for example as shown in the state diagram of FIG. 8. By way of summary, the IDLE state corresponds to the condition where no incomplete writeback exception has been detected, HOLD1 corresponds to the condition where an incomplete writeback exception has been detected and a second writeback has been requested. Similarly, the HOLD2 state corresponds to the condition where an incomplete writeback exception has been detected, and two additional writebacks have been requested. Each of the WAIT1 and WAIT2 states correspond to states in which the processing of an incomplete writeback exception is being performed by FPU 31. The REL1 and REL2 states correspond to states in which the writeback information from subsequently executed instructions are written back (and may include the processing of incomplete writeback exceptions for these results as well).

According to this exemplary embodiment of the invention, writeback queue control logic 75 controls the selection of multiplexer 72, and the receipt of data by writeback queue buffer 74 in response to writeback request signal WBR and busy signal BUSY. These controls correspond to state transitions, which are responsive to the WBR and BUSY signals as indicated in FIG. 8, as follows:

| From State | Transition Signals | To State | Control Results |
| --- | --- | --- | --- |
| IDLE | BUSY=0 | IDLE | MUX 72 selects WB ENa, ENb=0 |
| IDLE | WBR=1; BUSY=1 | HOLD1 | MUX 72 selects OFF ENa=1, ENb=0 |
| HOLD1 | WBR=1 | HOLD2 | MUX 72 selects OFF ENa=0; ENb=1 |
| HOLD1 | WBR=0 | WAIT1 | MUX 72 selects WB ENa, ENb=0 |
| HOLD2 | unconditional | WAIT2 | MUX 72 selects OFF |

-continued

| From State | Transition Signals | To State | Control Results |
|---|---|---|---|
| WAIT1 | BUSY=1 | WAIT1 | MUX 72 selects WB ENa, ENb=0 |
| WAIT1 | BUSY=0 | REL1 | MUX 72 selects 74a ENa, ENb=0 |
| WAIT2 | BUSY=1 | WAIT2 | MUX 72 selects WB ENa, ENb=0 |
| WAIT2 | BUSY=0 | REL2 | MUX 72 selects 74a ENa, ENb=0 |
| REL1 | BUSY=1 | REL1 | MUX 72 selects WB ENa, ENb=0 |
| REL1 | BUSY=0 | IDLE | MUX 72 selects WB ENa, ENb=0 |
| REL2 | BUSY=1 | REL2 | MUX 72 selects WB ENa, ENb=0 |
| REL2 | BUSY=0 | REL1 | MUX 72 selects 74b ENa, ENb=0 |

In operation, writeback queue control logic 75 begins in the IDLE state. Upon each writeback that does not cause an incomplete writeback operation (WBR=1, BUSY=0), writeback queue control logic 75 causes multiplexer 72 to select writeback bus WB, for application to router portion 54b. If, however, a writeback request for the next instruction is received in conjunction with FPU scheduler 50 having detected an incomplete writeback exception in the results of the preceding instruction (WBR=1 AND BUSY=1), writeback queue control logic 75 advances to the HOLD1 state, enables writeback queue buffer entry 74a to receive the state of writeback bus WB (ENa=1), and causes multiplexer 72 to select the dummy state (lines OFF) for receipt by router portion 54a so that the results of this succeeding instruction are not prematurely written back.

The transition from the HOLD1 state occurs after one machine cycle, with the destination state depending upon whether a second writeback request is received. If no additional writeback request is received (WBR=0), writeback queue control logic 75 enters the WAIT1 state, disables additional storage of writeback bus in writeback queue buffer 74 (ENa, ENb=0) and controls multiplexer 72 to select the output of writeback bus WB for presentation at its output. The selection of writeback bus WB permits the intermediate and final results of the incomplete writeback exception processing to be communicated through writeback control circuitry 70 to router 54. Writeback queue control logic 75 remains in the WAIT1 state until the incomplete writeback exception processing is finished (BUSY=0), responsive to which the REL1 state is entered. In the transition to the REL1 state from the WAIT1 state, multiplexer 72 is controlled to select the contents of writeback queue buffer entry 74a for application to router 54, to present the results of the first instruction following the initial exception-causing instruction. It is possible, of course, that these results (i.e., those temporarily stored in writeback queue buffer entry 74a) will also cause an incomplete writeback exception; if so, line BUSY is again asserted by FPU scheduler 50; writeback queue control logic 75 will then remain in the REL1 state (controlling multiplexer 50 to select writeback bus WB to communicate the results of the incomplete writeback exception processing), until line BUSY is released. Once line BUSY is released, control passes back to the IDLE state, for continued communication of writeback results until the next incomplete writeback exception is encountered.

Referring back to the HOLD1 state, if a second writeback request is received in the HOLD1 state, control will pass to the HOLD2 state; in this transition, the contents of writeback bus WB, which correspond to the results of a second succeeding instruction following the instruction that caused the exception, are stored in writeback queue buffer entry 74b (ENb=1). Multiplexer 72 will continue to select lines OFF for presentation to router 54, so that these results are not prematurely written back. In the HOLD2 state, no additional writebacks are possible because the pipeline has been flushed, as will be noted below, and a transition is unconditionally made to the WAIT2 state to wait for the completion of the incomplete writeback exception processing. Writeback queue control logic 75 remains in the WAIT2 state until the BUSY signal is released, at which time a transition is made to the REL2 state, during which the contents of the first writeback queue buffer entry 74a are selected by multiplexer 72 for presentation to router 54. If these results do not cause an exception (i.e., line BUSY remains low), control passes to state REL1 in a transition during which the contents of the second writeback queue buffer entry 74b are selected by multiplexer 72 for writeback. If these results also do not cause an exception (BUSY=0), control returns to the IDLE state. If either (or both) of the contents of writeback queue buffer entries 74a, 74b cause an incomplete writeback exception, control will remain in states REL2, REL1, respectively, until the exception is processed.

With this understanding of the operation of writeback queue control logic 75, the operation of writeback queue circuitry 70 in cooperation with router 54 according to the preferred embodiment of the invention will now be described in detail relative to FIG. 9. This operation begins with process 120, in which $3^{rd}$ execution stage 60 of FPU 31 executes an instruction k to produce a result (k being an x86ID value that indicates the program order of the instruction). At this point, for purposes of this description, the state of the pipeline in FPU 31 is as follows:

| FPU pipeline stage | Instruction x86ID |
|---|---|
| FPU queue (51) | k+4 |
| FPU schedule (53) | k+3 |
| FPU 1st execution stage (56) | k+2 |
| FPU 2nd execution stage (58) | k+1 |
| FPU 3rd execution stage (60) | k |

As FPU 31 is a three-stage pipelined unit, instructions k+1, k+2 will be executed by $2^{nd}$ execution stage 58 and $1^{st}$ execution stage 56, respectively, simultaneously with process 120. The result of process 120, and thus the result of the execution of instruction k, is presented by $3^{rd}$ execution stage 60 on writeback bus WB. FPU scheduler 50 then determines, in process 121, if the result of process 120 is an incomplete writeback exception, and communicates the results of this determination to writeback queue control logic 75 on line BUSY. As noted above, those exceptions to be detected by writeback queue control 75 in decision 121 include those exceptions that will require additional processing by FPU 31 prior to effecting a writeback of the result to memory, such exceptions referred to as incomplete writeback exceptions. One example of an incomplete writeback exception is an underflow condition, where the normalized number presented on writeback bus WB, in ZBUS format, has an exponent below the minimum exponent for the IEEE precision level associated with instruction k. In such a case, the result of instruction k will require reformatting into a denormalized operand (i.e., an operand without an implied leading 1, but with an exponent value within range) prior to writeback; in this example, such reformatting requires additional operations by FPU 31 according to a microcode sequence stored in microsequencer 47.

If the result of instruction k presented on writeback bus WB does not present an exception (decision 121 is NO), normal writeback processing may be performed. This is illustrated in FIG. 9 beginning with process 124 in which FPU scheduler 50 updates the floating-point status word (FSW) with the status information associated with the results of instruction k. Process 126 is then performed by router portion 54b to effect the writeback of these results to the appropriate location (as indicated by the directives in the control portion of the results) via bus STORE_DATA and register file 39. In parallel with processes 124, 126, FPU 31 causes each of the instructions in its pipeline to advance to the next pipeline stage in process 125. Process 120 is then repeated for the next instruction (i.e., instruction k+1).

In the event that the result of the execution of instruction k by $3^{rd}$ execution stage 60 presented an incomplete writeback exception (i.e., decision 121 is YES, and thus line BUSY=1), process 130 is then performed by FPU scheduler 50 calling a microcode sequence for reformatting the results received by FPU router portion 54a into the desired format, followed by the initiation of the microcode sequence (referred to in FIG. 9 by DNORM) by FPU scheduler 50 applying the appropriate microcode address to FPU microsequencer 47. FPU microsequencer 47 will then begin issuing the appropriate microinstructions to FPU scheduler 50 for execution of the called DNORM microsequence. Process 132 is then performed by FPU 31 flushing the stages of its pipeline that are not to be executed prior to completion of instruction k having an incomplete writeback exception. In this example, the FPU pipeline is flushed for stages upstream from the execution stages, namely instructions k+3, k+4 in the queue and schedule stages, respectively. FPU scheduler 50 then issues the DNORM microinstruction sequence in process 134, which is executed, in process 136, upon the results presented to FPU register file 52 by process 128. The DNORM microinstruction sequence may require multiple machine cycles to execute, and thus may correspond to a series of instructions issued by FPU scheduler 50 and executed by execution stages 56, 58, 60 in a pipelined fashion.

According to this preferred embodiment of the invention, the instructions that have already been issued to and executed by execution stages 56, 58 (namely instructions k+2, k+1, respectively) at the time of the detection of an exception in the result of the preceding instruction (i.e., instruction k) are not flushed from the pipeline of FPU 31, but are instead permitted to execute. Accordingly, in parallel with processes 132, 134, 136, process 133 effects the execution of the next succeeding instruction k+1 by $3^{rd}$ stage execution unit 60 (simultaneously with the execution of the following instruction k+2 by $2^{nd}$ stage execution unit 58), resulting in a writeback request. At this point in time, writeback queue control logic 75 will be in the IDLE state described above, and will receive the combination of a writeback request on line WBR with line BUSY remaining active, causing a transition to the HOLD1 state described above. In process 135, the results of the execution of instruction k+1are then stored in entry 74a of writeback queue buffer 74 (ENa=1), under the control of writeback queue control logic 75. The output of multiplexer 72 first selects lines OFF so that the results of the execution of instruction k+1 are not forwarded to the writeback stage.

In process 137, $3^{rd}$ execution stage 60 executes the next instruction k+2, and generates a writeback request signal on line WBR while line BUSY remains active (as the original incomplete writeback exception has not yet cleared), causing a transition to the HOLD2 state. In process 138, the results are stored in the other entry 74b of writeback queue buffer 74, again under the control of writeback queue control logic 75 (ENb=1), while lines OFF remain selected by multiplexer 72 to preclude a premature writeback. Once the last instruction k+2 has been executed and its results stored in writeback queue buffer 74 (state WAIT2 having been entered), $3^{rd}$ execution stage 60 can complete the execution of the microcoded instructions in the DNORM sequence (thus completing process 136). As noted above, in the WAIT2 state, writeback queue control logic 75 will cause multiplexer 72 to select writeback bus WB for application to router 54, so that the intermediate and final results of the DNORM sequence (which may require multiple passes through FPU 31) may be communicated.

Upon completion of both of processes 136 and process 138 (illustrated in FIG. 9 by AND function 139), process 140 may be performed to writeback the results of executed instructions k+1, k+2 to the appropriate memory or register locations in program order. At this point in time, prior to performing process 140, line BUSY is released by FPU scheduler 50, the results of the DNORM microcode sequence have been presented upon writeback bus WB and to router 54 via multiplexer 72, with the results of the succeeding instructions k+1, k+2 remaining stored in writeback queue buffer 74. Referring now to FIG. 10, writeback process 140 according to the preferred embodiment of the invention will now be described in further detail.

Writeback process 140 is illustrated as beginning with process 144, in which multiplexer 72 applies, to router portion 54b, the final results of the DNORM microcode sequence for instruction k which are present on writeback bus WB. In this example, where the exception was due to an underflow condition where the exponent value of the result was below the minimum for the specified IEEE precision level, these results are in the form of a denormalized operand where the mantissa is a fractional amount and where the exponent is within the proper IEEE precision range. Process 146 is then performed by FPU scheduler 50 to update the floating-point status word FSW which, in this example, includes setting the DN bit of the floating-point status word FSW to indicate that the operand being written back is a denormalized operand. Process 148 is then performed to effect the writeback of these results on bus STORE_DATA to the appropriate register in register file 39, and ultimately to memory if such is indicated by the directives associated with these results.

Writeback process 140 then continues in program order, beginning with decision 149 in which the results of instruction k+1, stored in writeback queue buffer 74a, are selected by multiplexer 72 (in the transition from the WAIT2 state to the REL2 state in this example), and are analyzed by FPU scheduler 50 to determine if these results raise an exception, such as an underflow as in the previously handled case of instruction k. If the results of instruction k+1 also constitute an exception that would cause an incomplete writeback (e.g., an underflow operand in normalized form that must be expressed as a denormalized operand), FPU scheduler 50 again asserts line BUSY, writeback queue control logic 75 remains in the REL2 state, and process 150 is performed to execute the appropriate sequence upon these results. According to this preferred embodiment of the invention, where the denormalized sequence DNORM is a microcode sequence, process 150 would involve FPU scheduler 50 again calling FPU microsequencer 47, and FPU microsequencer 47 again issuing the appropriate microcode instructions to FPU scheduler 50. The operand that is to be processed is forwarded by multiplexer 72 to FPU router portion 54a for application to FPU execution stages 56, 58, 60 as operands for the DNORM sequence. Upon completion of the DNORM sequence, the reformatted results of instruction k+1 will be presented upon writeback bus WB.

This operation of FPU 31 illustrates the ability provided according to the preferred embodiment of the invention to utilize FPU resources, including non-pipelined resources, to effect those operations required to complete the writeback operation. In this example, where the results of instructions k and k+1 are both exceptions, FPU microsequencer 47 is a nonpipelined resource that was allocated properly to each operand without conflict, as controlled by writeback queue circuitry 70. As such, access to FPU microsequencer 47 for the reformatting of the results of instruction k+1 is not requested until after such access has been made for the results of instruction k, precluding resource conflict.

Upon completion of process 150 if performed, or if the results of instruction k+1 as stored in writeback queue buffer 74 did not raise an exception (i.e., decision 149 is NO), process 152 is performed by multiplexer 72 being controlled by writeback queue control logic 75 to apply the results and status for instruction k+1 to router portion 54b. These results are located either in writeback queue buffer 74 (if decision 149 is NO) or on writeback bus WB (if decision 149 is yes and process 150 is complete). The floating-point status word FSW is updated appropriately for these results by FPU scheduler 50 in process 154, and the results written back to the appropriate register or resource via bus STORE_DATA in process 156. In either of these cases, writeback queue control logic will proceed to the REL1 state, as described above, selecting the contents of writeback queue buffer entry 74b for application to router 54.

Decision 157 is next performed to analyze the results of instruction k+2, in similar manner as decision 149 for the results of instruction k+1 described hereinabove. Again, if an incomplete writeback exception is present (decision 157 is YES), process 158 is performed to process the results of instruction k+2 by way of a microcode sequence, as described hereinabove relative to process 150. In this case, writeback queue control logic 75 will remain in the REL1 state until line BUSY is released. Upon completion of process 158, or if an incomplete writeback exception was not present (decision 157 is NO), control passes to process 160, in which the result and status of instruction k+2 are presented by multiplexer 72 to router portion 54b. In process 160, multiplexer 72 selects the state of writeback bus WB if process 158 was performed, or otherwise selects the appropriate entry in writeback queue buffer 74. Process 162 is then performed by FPU scheduler 50 to update the floating-point status word FSW with the status corresponding to the results of instruction k+2 (including the setting of bit DN to indicate whether the operand is denormalized), followed by process 164 in which the results are written to register file 39 or to memory via bus STORE_DATA. Writeback queue control logic 75 will be in the IDLE state at this time.

Figure 9:
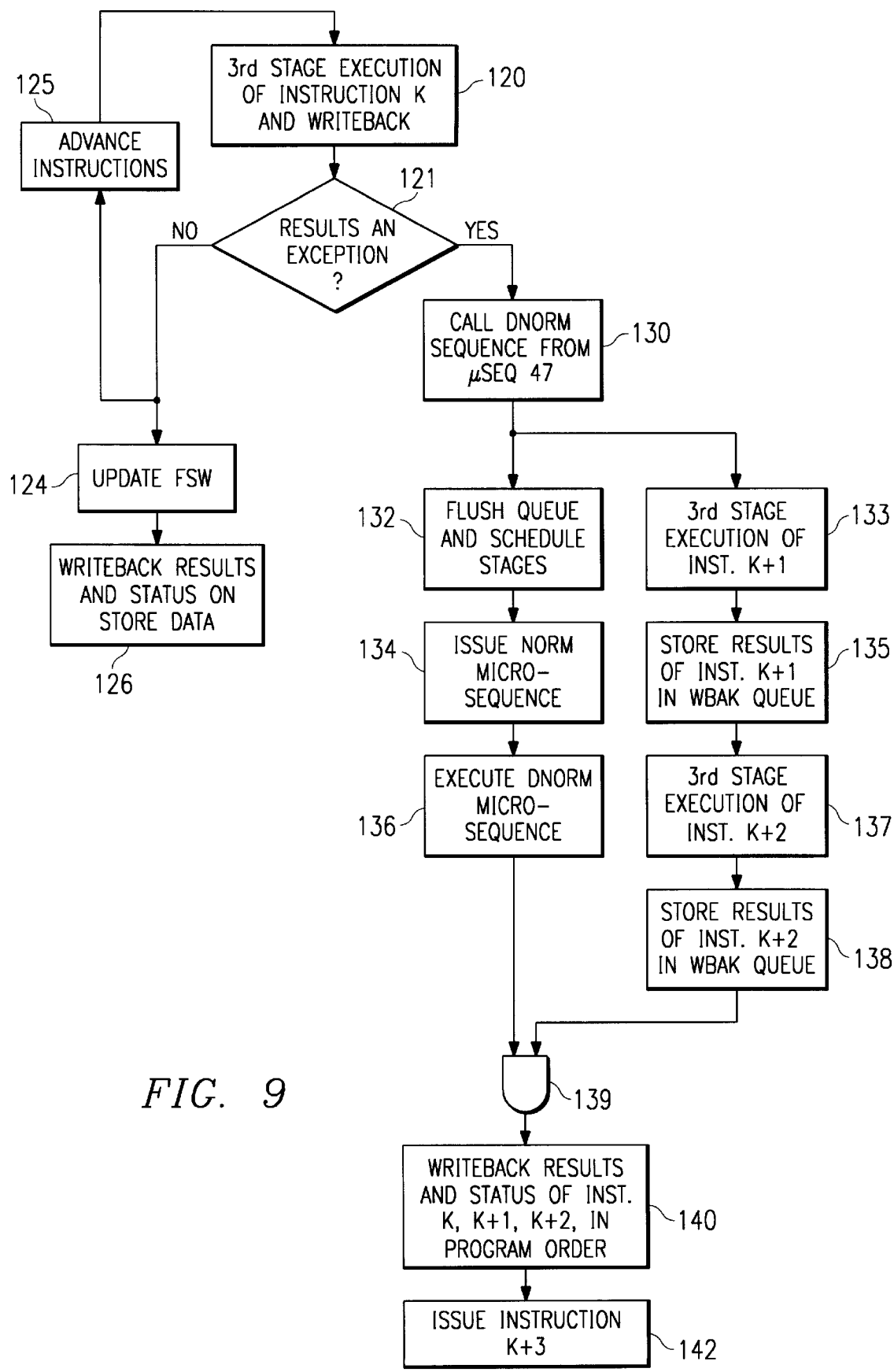
FIG. 9 is a flow chart illustrating a method of operation of the writeback queue control of the floating-point unit of FIG. 3 according to the preferred embodiment of the invention.
Figure 10:
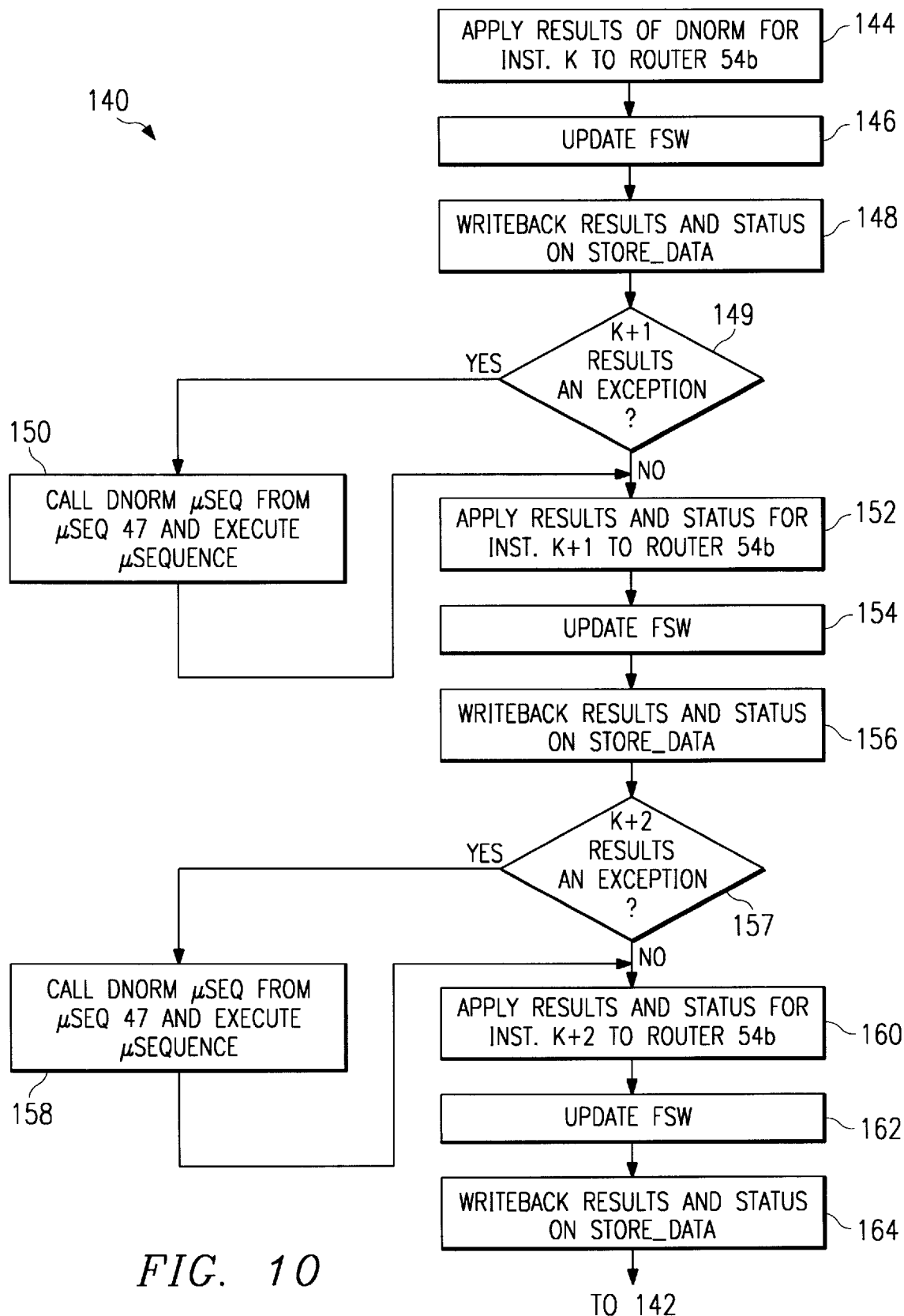
FIG. 10 is flow chart illustrating, in detail, the writeback operation in the method of FIG. 9 according to the preferred embodiment of the invention.

Once instructions k, k+1, k+2 have been processed in this manner, control passes to process 142 of FIG. 9, in which the next instruction (instruction k+3) in program order is fetched, and the pipeline of FPU 31 again refilled. Upon completion of the execution of an instruction by $3^{rd}$ execution stage 60, process 120 is again performed and operation continues as described hereinabove.

According to the preferred embodiment of the invention, therefore, instructions giving rise to exceptions are completed, in the sense of writeback and status word update, in program order, without requiring flushing of the entire FPU pipeline. In addition, the completion of the exception processing may be effected even in the case where the pipelined execution units are required. This is accomplished in a way that permits those instructions in the later stages of execution may be completed, and their results and status stored in a buffer in the event that an earlier instruction cannot complete. However, buffering is not performed unconditionally for each instruction, as in the case of full out-of-order execution processors.

Also according to the preferred embodiment of the invention, non-pipelined resources may be used in processing the exceptions. Furthermore, the preferred embodiment of the invention enables the use of FPU resources to also handle exceptions generated in the later-completed instructions, without conflict. For example, the exception handling resources may be handled by the execution of microcode sequences, thus eliminating the need for dedicated hardware to handle the exceptions, and thus maintaining efficient FPU implementation.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A microprocessor integrated circuit, implemented into an integrated circuit, comprising:

a register file for storing integer digital data words in binary form, and for storing floating-point operands in a form having mantissa and exponent portions;

an integer execution unit, for performing arithmetic and logical operations upon operands stored in the register file; and a floating-point unit, for performing arithmetic data processing operations upon floating-point operands:

a plurality of floating-point execution stages, for receiving at least one floating-point operand in an internal format having more bit positions than the first precision format, for performing a data processing operation thereupon corresponding to a plurality of floating-point instructions in pipelined fashion, and for presenting results of the floating-point instructions on a writeback bus;

router circuitry, for presenting results of floating-point instructions from the floating-point execution stages to the register file in program order;

floating-point control circuitry for detecting exceptions in results from the floating-point execution stages;

a writeback queue buffer, coupled to the writeback bus, for storing a result of a floating-point instruction; and writeback control circuitry, coupled to the writeback bus and to the router circuitry, for enabling the writeback queue buffer to store the result of the floating-point instruction responsive to the floating-point control circuitry detecting an exception in the result of a previous floating-point instruction.

2. The microprocessor of claim 1, wherein the floating-point unit further comprises:

a floating-point status word register, for storing status information regarding results of the floating-point execution stages;

wherein the floating-point control circuitry is also for writing status information to the floating-point status word register corresponding to results from the floating-point execution stages.

3. The microprocessor of claim 2, wherein the writeback control circuitry comprises:

a multiplexer, having a data input coupled to the writeback queue buffer, having a data input coupled to the writeback bus, having an output coupled to the router circuitry, and having a control input; and control logic, having an input coupled to the floating-point control circuitry, and having an output coupled to the control input of the multiplexer, for controlling the multiplexer to couple the writeback bus to the router circuitry responsive to the floating-point control circuitry not detecting an exception in the result of a previous floating-point instruction.

4. The microprocessor of claim 3, wherein the control logic also has an output coupled to the writeback queue buffer, for enabling the writeback queue buffer to store the result of the floating-point instruction on the writeback bus responsive to the floating-point control circuitry detecting an exception in the result of a previous floating-point instruction.

5. The microprocessor of claim 4, wherein the floating-point control circuitry is also for controlling the plurality of floating-point execution stages to reprocess the result of a floating-point instruction having an exception.

6. The microprocessor of claim 5, wherein the floating-point unit further comprises:

a microsequencer, for storing microcode instructions which, when executed by the plurality of floating-point execution stages, reprocess the result of a floating-point instruction having an exception.

7. The microprocessor of claim 5, wherein the control logic is also for controlling the multiplexer to couple the writeback queue buffer to the router circuitry responsive to the floating-point execution stages completing the reprocessing of the result of a floating-point instruction having an exception.

8. The microprocessor of claim 7, wherein the writeback queue buffer comprises a plurality of entries, for storing results of a plurality of floating-point instructions responsive to the floating-point control circuitry detecting an exception in the result of a previous floating-point instruction.

9. The microprocessor of claim 1, wherein the register file stores floating-point operands using a first plurality of bits in a first precision form;

and wherein the writeback bus comprises a plurality of conductors for conducting an operand, the plurality of conductors being of greater number than the first plurality of bits.

10. The microprocessor of claim 9, wherein the floating-point control circuitry detects denormalized operand exceptions in results from the floating-point execution stages.

11. A method of operating a microprocessor having a floating-point unit, comprising the steps of:

presenting a sequence of floating-point instructions to a pipelined floating-point unit for execution;

responsive to executing a first floating-point instruction in the sequence of floating-point instructions, presenting a result onto a writeback bus;

determining whether the result of the first floating-point instruction generates an exception;

executing a second floating-point instruction in the sequence of floating-point instructions;

responsive to the determining step detecting an exception, applying the result of the first floating-point instruction to the floating-point unit, presenting an exception handling sequence of instructions to the floating-point unit in combination therewith, and storing the result of the second floating-point instruction in a writeback queue buffer;

responsive to the determining step not detecting an exception, writing the result of the first floating-point instruction into a register file; and responsive to the determining step not detecting an exception and after the step of executing a second floating-point instruction, writing the result of the second floating-point instruction into the register file.

12. The method of claim 11, further comprising:

after the step of presenting an exception handling sequence of instructions to the floating-point unit in combination with the result of the first floating-point instruction, writing the result of the exception handling sequence of instructions to the register file.

13. The method of claim 12, further comprising:

after the step of writing the result of the exception handling sequence of instructions to the register file, writing the result of the second floating-point instruction from the writeback queue buffer to the register file.

14. The method of claim 12, further comprising:

after the step of writing the result of the exception handling sequence of instructions to the register file, determining whether the result of the second floating-point instruction generates an exception;

responsive to the determining step detecting an exception in the result of the second floating-point instruction, applying the result of the second floating-point instruction to the floating-point unit, presenting an exception handling sequence of instructions to the floating-point unit in combination therewith; and responsive to the determining step not detecting an exception in the result of the second floating-point instruction, writing the result of the second floating-point instruction from the writeback queue buffer to the register file.

15. The method of claim 14, further comprising:

after the step of presenting an exception handling sequence of instructions to the floating-point unit in combination with the result of the second floating-point instruction, writing the result of the exception handling sequence of instructions to the register file.

16. The method of claim 11, further comprising:

after each step of writing a result into the register file;

updating a floating-point status word with the status of the operand corresponding to the result of the floating-point instruction.

17. The method of claim 11, further comprising:

after the step of executing a second floating-point instruction in the sequence of floating-point instructions, executing a third floating-point instruction in the sequence of floating-point instructions;

responsive to the determining step detecting an exception, storing the result of the third floating-point instruction in a writeback queue buffer.

18. The method of claim 11, further comprising:

responsive to the determining step detecting an exception, flushing at least one of the sequence of floating-point instructions from the pipelined floating-point unit.

19. The method of claim 11, wherein the exception is detected responsive to the result of the first floating-point instruction representing a floating-point number that is out of range of a predetermined precision format.

20. The method of claim 19, wherein the exception handling sequence of instructions reformats the result of the first floating-point instruction into a denormalized operand according to the predetermined precision format.

* * * * *

UNITED STATES PATENT AND TRADEMARK OFFICE
CERTIFICATE OF CORRECTION

PATENT NO. : 5,884,062
DATED : 3/16/99
INVENTOR(S) : Shannon A. Wichman, Tuan Q. Dao, Naoki Hayashi It is certified that error appears in the above-identified patent and that said Letters Patent is hereby corrected as shown below:

Cover Page, insert Item [60] under Related U.S. Application Data

--Provisional Application No. 60/025,106 August 30, 1996.--

Signed and Sealed this

Eighth Day of May, 2001

Attest:

NICHOLAS P. GODICI

Attesting Officer

Acting Director of the United States Patent and Trademark Office